(12) United States Patent
Chaudhry

(10) Patent No.: US 6,212,048 B1
(45) Date of Patent: Apr. 3, 2001

(54) COMBINATION GROUND FAULT CIRCUIT INTERRUPTER/SURGE SUPPRESSOR

(76) Inventor: Nisar A. Chaudhry, 100 Melville Rd., Huntington Station, NY (US) 11746

( * ) Notice: Subject to any disclaimer, the term of this patent is extended or adjusted under 35 U.S.C. 154(b) by 0 days.

(21) Appl. No.: 09/299,265

(22) Filed: Apr. 26, 1999

(51) Int. Cl.$^7$ ............................. H02H 3/16; H02H 1/00
(52) U.S. Cl. ............................. 361/42; 361/49; 361/117
(58) Field of Search ................... 361/42, 49–50, 361/54, 56, 58, 111, 112, 117, 118, 119; 379/2, 399, 412; 307/99

(56) References Cited

U.S. PATENT DOCUMENTS

| | | | |
|---|---|---|---|
| 4,023,071 | * | 5/1977 | Fussell .................................. 361/56 |
| 4,025,822 | * | 5/1977 | Hughes et al. ........................ 361/45 |
| 4,438,477 | | 3/1984 | Cawley . |
| 4,807,083 | * | 2/1989 | Austin .................................. 361/111 |
| 4,903,161 | * | 2/1990 | Huber et al. ........................... 361/56 |
| 5,566,056 | | 10/1996 | Chaudhry . |
| 5,654,857 | | 8/1997 | Gershen . |
| 5,844,764 | * | 12/1998 | Meyerhoefer et al. ............... 361/111 |

* cited by examiner

Primary Examiner—Josie Ballato
Assistant Examiner—Kim Huynh

(57) ABSTRACT

Combination ground fault circuit interrupter/surge suppressor which provides overvoltage protection for AC power lines, coaxial transmission lines and communication lines without a separate ground conductor.

21 Claims, 9 Drawing Sheets

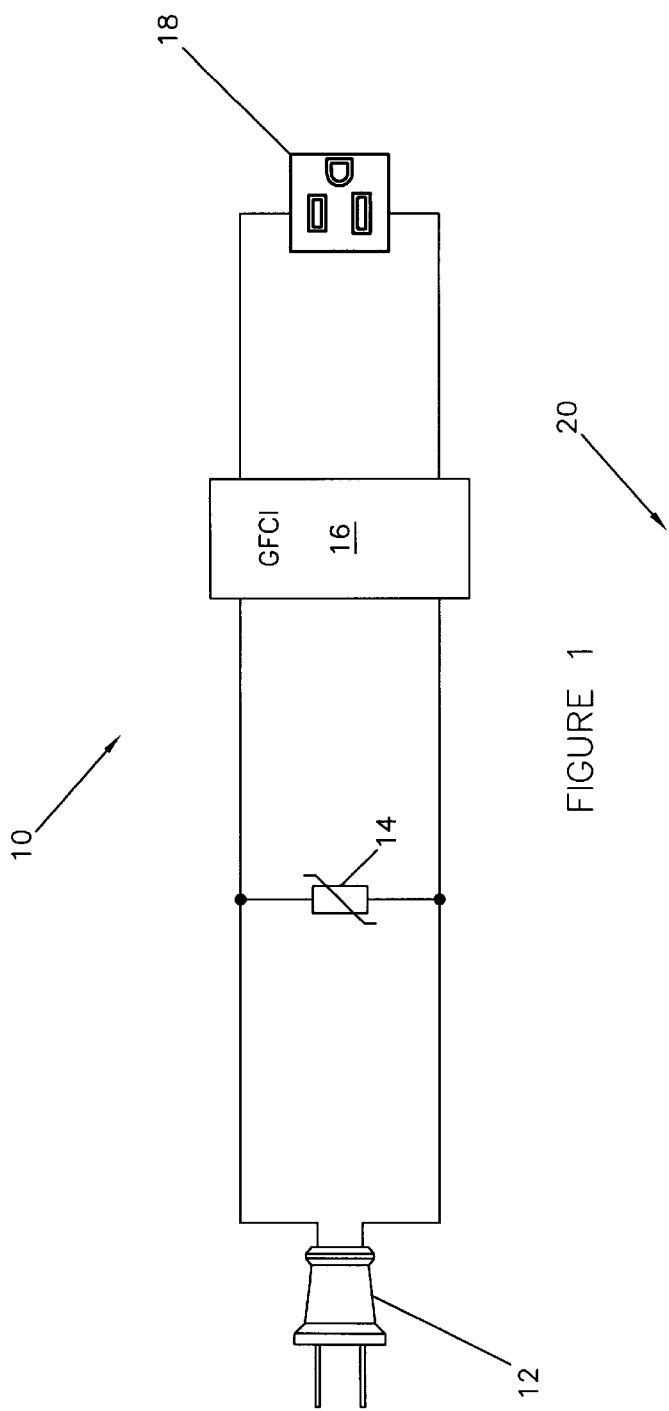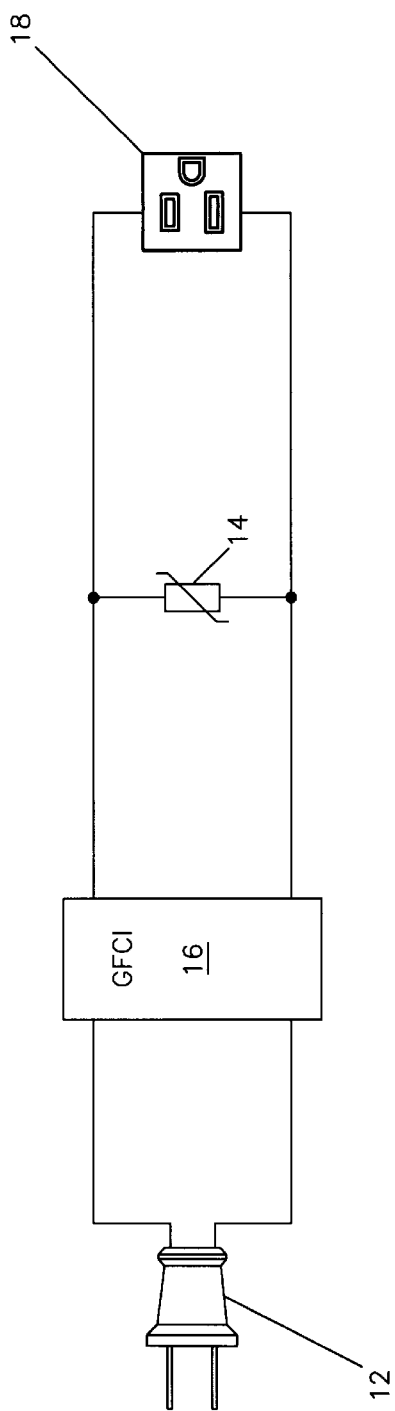

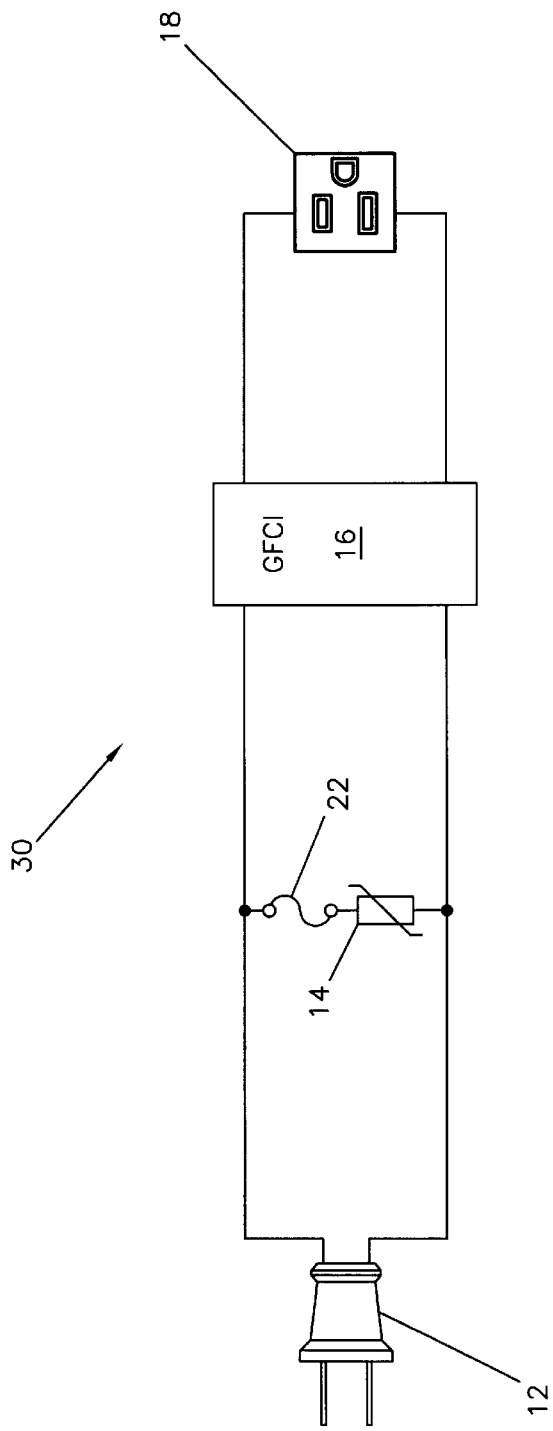
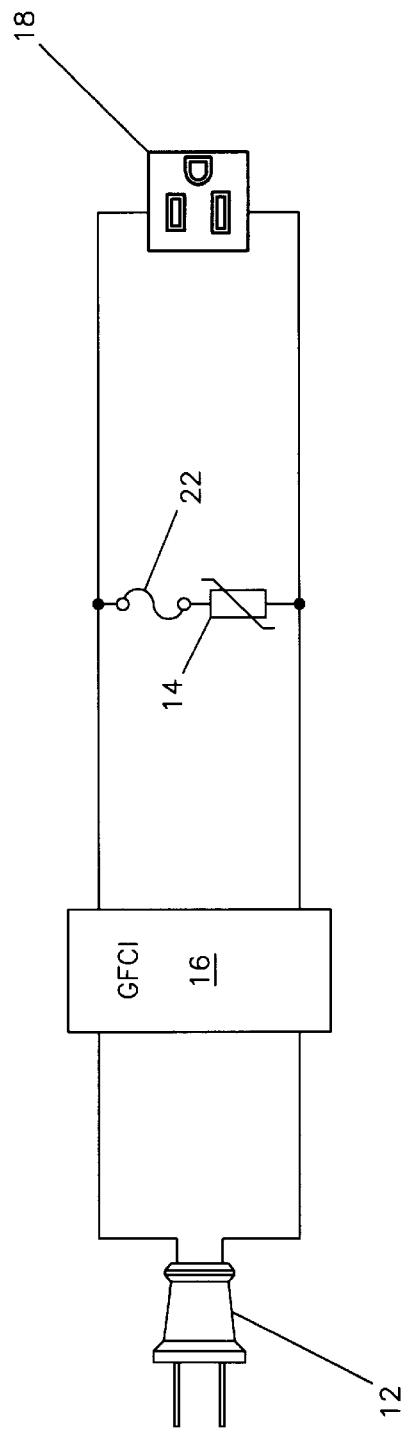
FIGURE 3
FIGURE 4

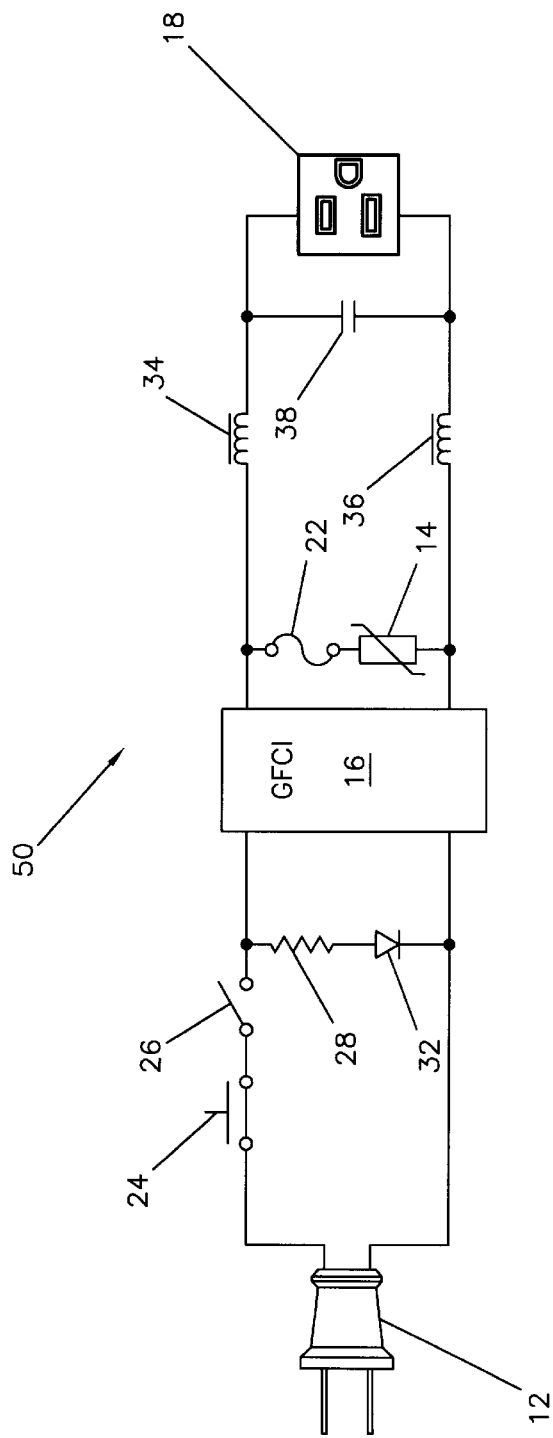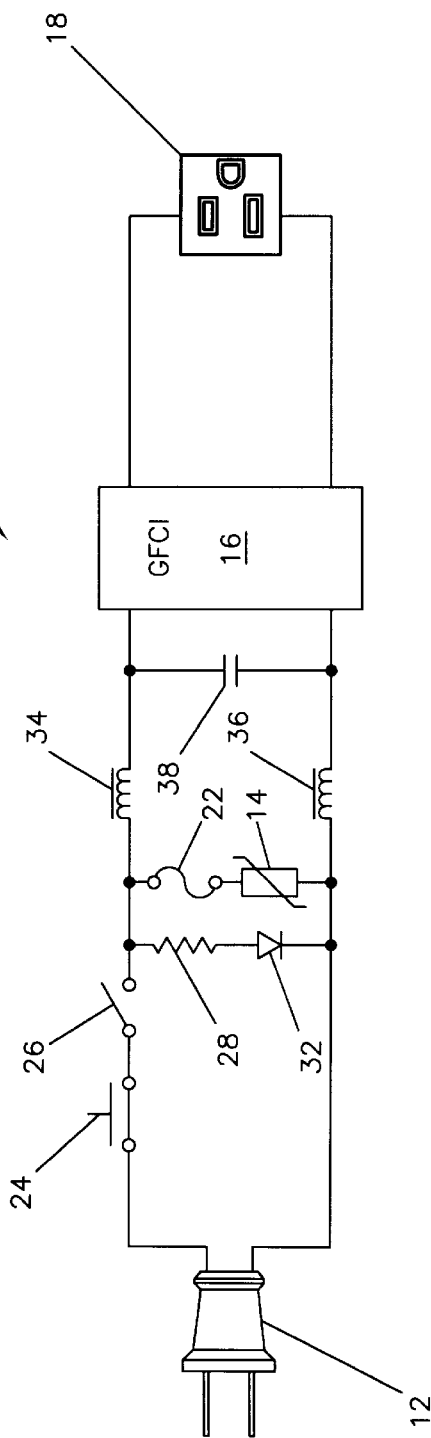
FIGURE 5
FIGURE 6

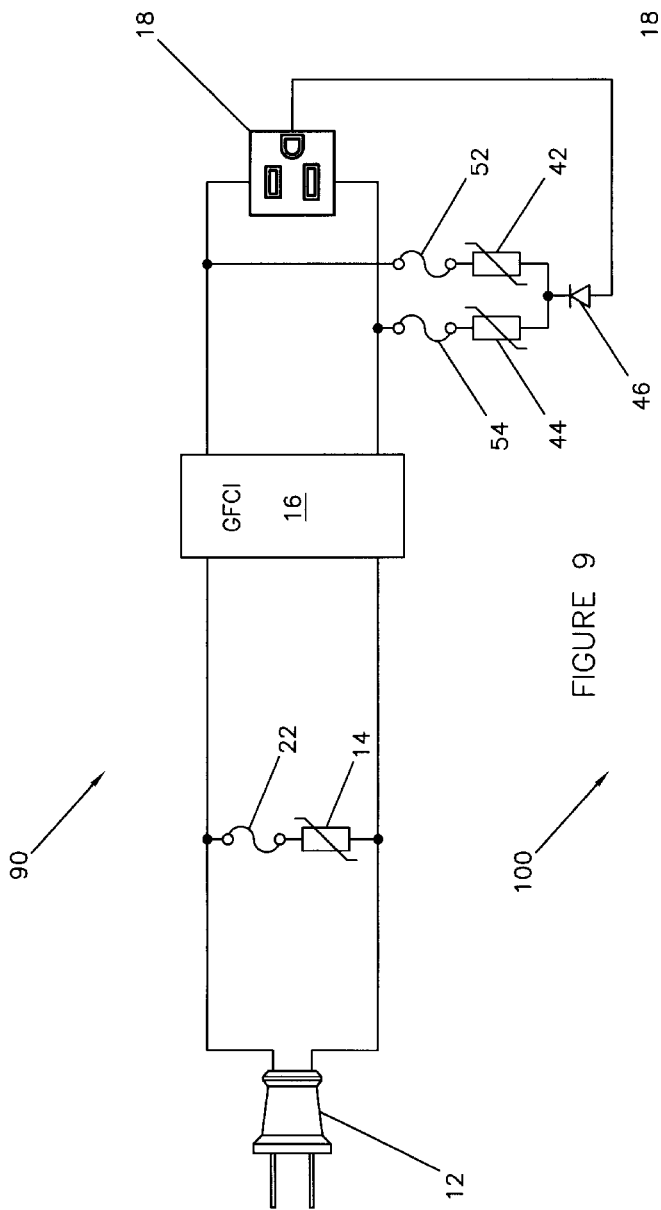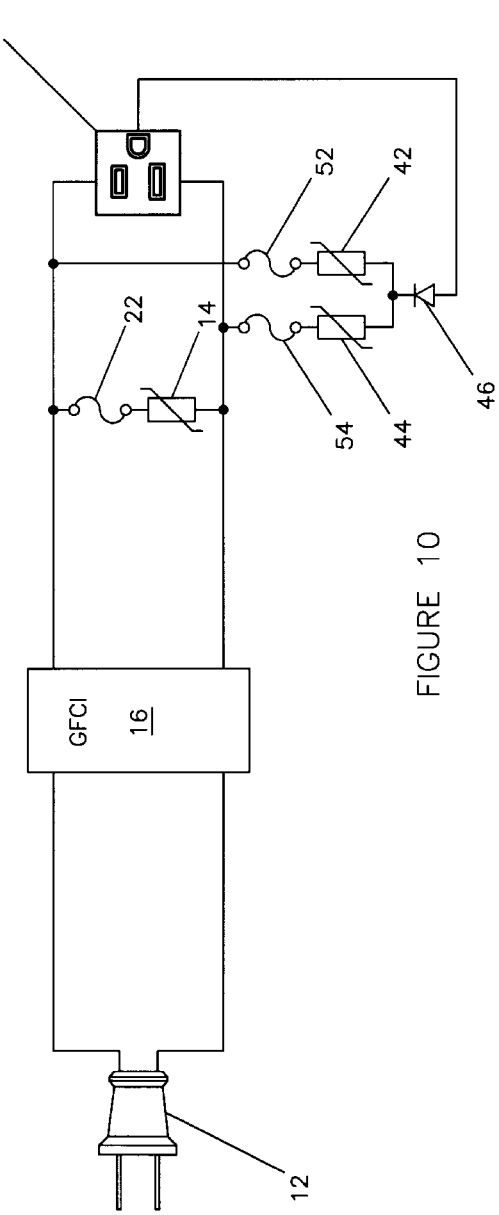

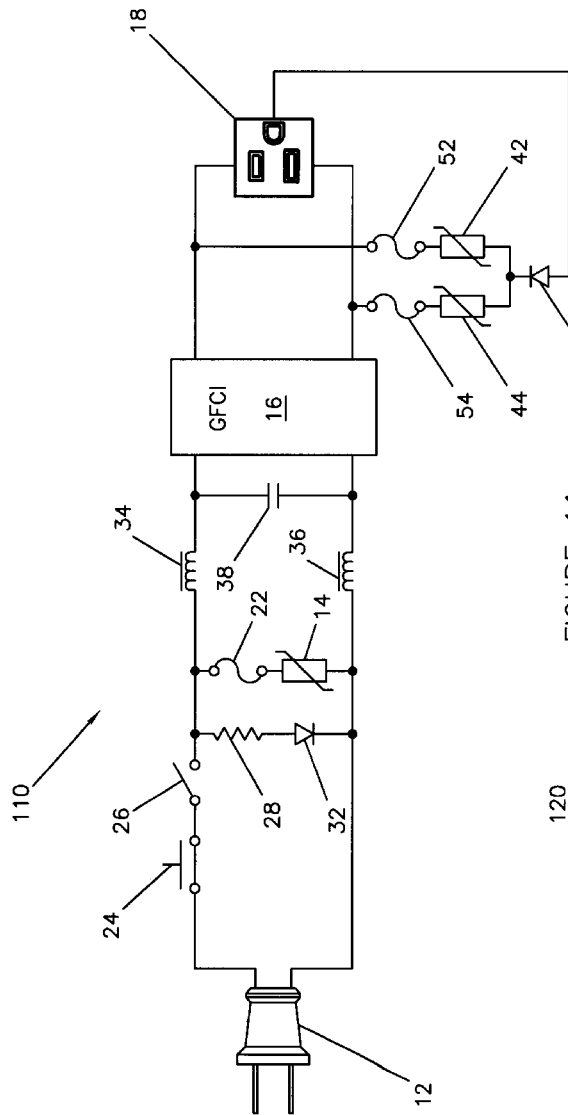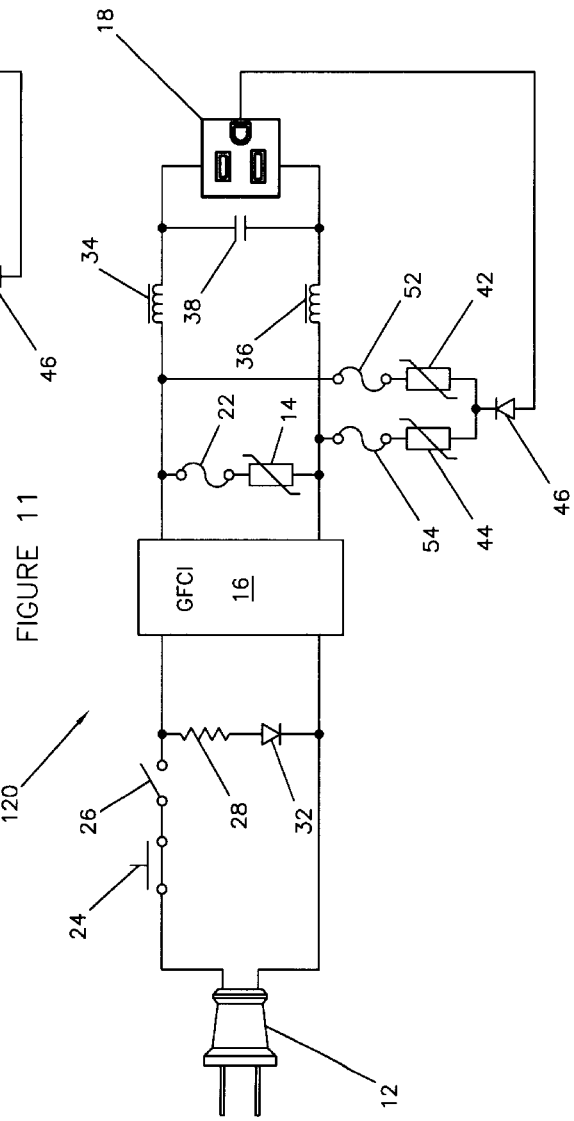
FIGURE 11
FIGURE 12

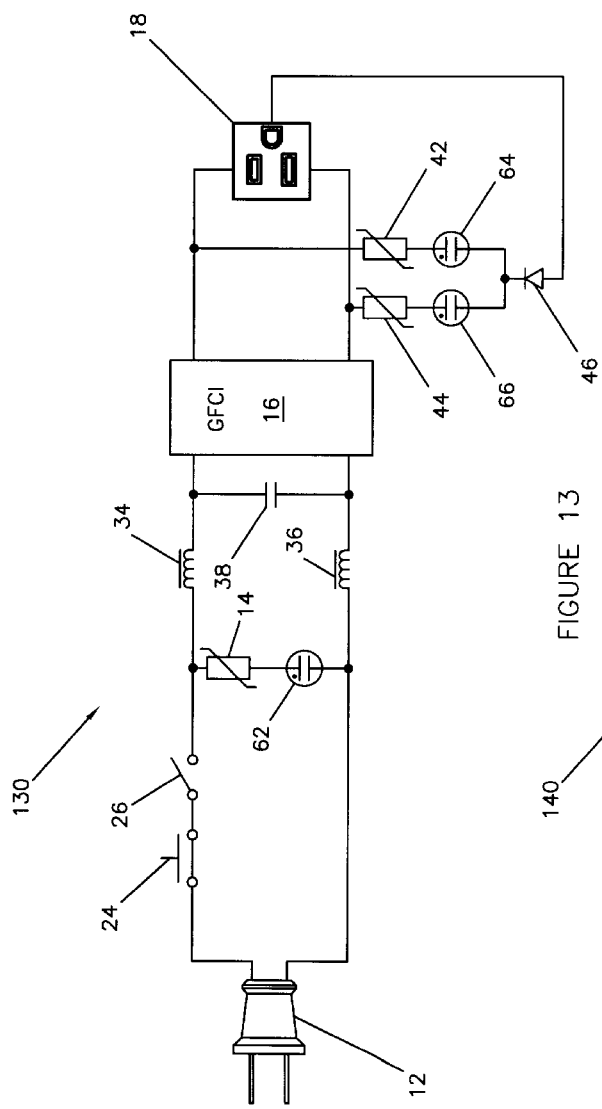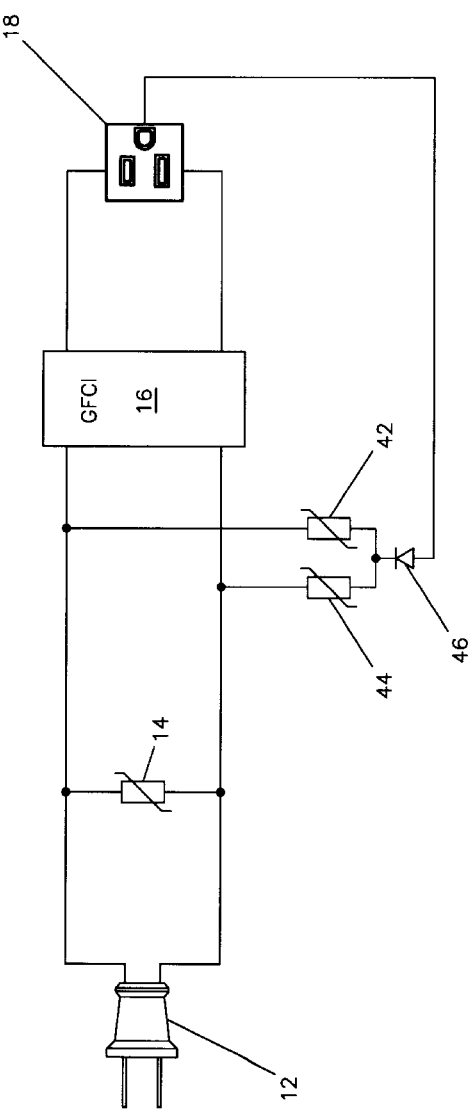
FIGURE 13
FIGURE 14

COMBINATION GROUND FAULT CIRCUIT INTERRUPTER/SURGE SUPPRESSOR

BACKGROUND OF THE INVENTION

1. Field of the Invention

The present invention relates to combination/circuit interrupter/overvoltage protection apparatus for protecting AC power lines, coaxial transmission lines and communication lines from overvoltage conditions without the use of a separate ground conductor.

2. Discussion of the Related Art

Today many homes and buildings use sensitive electronic equipment such as home entertainment centers with expensive audio/visual equipment, personal computers, modems, printers, copiers, facsimile machines and telephone answering machines. This sensitive electronic equipment is connected to the outside world by AC power lines, coaxial transmission lines (both cable TV, satellite dish antennas and broadband internet connections) and communication lines (telephone, facsimile and high speed data). Because the electronic equipment is expensive, there is a need to protect the equipment from voltage surges occurring on the AC power lines, the coaxial transmission lines and the communication lines.

To fill this need a number of companies have developed plug in secondary surge suppressors which are designed to plug into AC wall outlets which carry a separate ground conductor and which accept three prong AC power plugs. The electronic equipment, which also has three prong AC power plugs, is then plugged into the secondary surge suppressor. Some plug in secondary surge suppressors currently available also provide overvoltage protection for coaxial transmission lines and/or communication lines. See, for example, Cawley U.S. Pat. No. 4,438,477 issued Mar. 20, 1984, which discloses a plug in secondary surge suppressor which protects both AC power lines and communication lines from overvoltage conditions using the ground obtained from the AC outlet by means of a three prong AC power plug.

While newly-built homes and buildings have AC outlets which carry a separate ground wire and accept three prong AC power plugs, older homes and buildings have AC outlets which only accept two prong AC power plugs. Therefore, plug in secondary surge arrestors currently being marketed (which have three prong AC power plugs and use the ground from the AC outlet to provide overvoltage protection) cannot be used in older homes and buildings with AC outlets which only accept two prong AC power plugs. A need therefore exists for a plug in secondary surge suppressor which can be used with AC outlets which only accept two prong AC power plugs.

While many homes today have ground fault circuit interrupters (GFCIs), those devices are only found in areas where water or moisture is present. GFCIs are current sensing devices and are tripped when a current imbalance is detected, generaly for a substantial period of time (up to 25 milliseconds) compared to the time a voltage transient exists (tens of microseconds). GFCIs do not respond to overvoltage conditions and do not protect against overvoltage condidtions. Indeed, GFCIs may be damaged by overvoltage conditions.

SUMMARY OF THE INVENTION

The preferred embodiment of the present invention provides a plug in secondary surge suppressor which utilizes a two wire AC power source (no separate ground wire) to protect electrical equipment having three prong AC power plugs. The preferred embodiment of the present invention employs a GFCI in combination with an AC overvoltage protection circuit and a "virtual ground", i.e., a return path to the two wire AC power source through which voltage surges may be directed. The present invention fills the need for a surge suppressor which protects electrical equipment having three prong AC power plugs and which can be used in homes and buildings equipped with AC outlets which will only accept two prong AC power plugs.

The subject matter which I regard as my invention is more particularly pointed out in the claims at the end of the specification. The invention, including its method of operation and its numerous advantages, may best be understood by reference to the following description taken in conjunction with the accompanying drawings wherein like reference numerals refer to like compounds.

DESCRIPTION OF THE DRAWINGS

FIG. 1 is a schematic diagram of a first embodiment of the present invention;

FIG. 2 is a schematic diagram of a second embodiment of the present invention;

FIG. 3 is a schematic diagram of a third embodiment of the present invention;

FIG. 4 is a schematic diagram of a fourth embodiment of the present invention;

FIG. 5 is a schematic diagram of a fifth embodiment of the present invention;

FIG. 6 is a schematic diagram of a sixth embodiment of the present invention;

FIG. 9 is a schematic diagram of a ninth embodiment of the present invention;

FIG. 10 is a schematic diagram of a tenth embodiment of the present invention;

FIG. 11 is a schematic diagram of an eleventh embodiment of the present invention;

FIG. 12 is a schematic diagram of a twelfth embodiment of the present invention;

FIG. 13 is a schematic diagram of a thirteenth embodiment of the present invention;

FIG. 14 is a schematic diagram of a fourteenth embodiment of the present invention.

DETAILED DESCRIPTION

Figure 7:
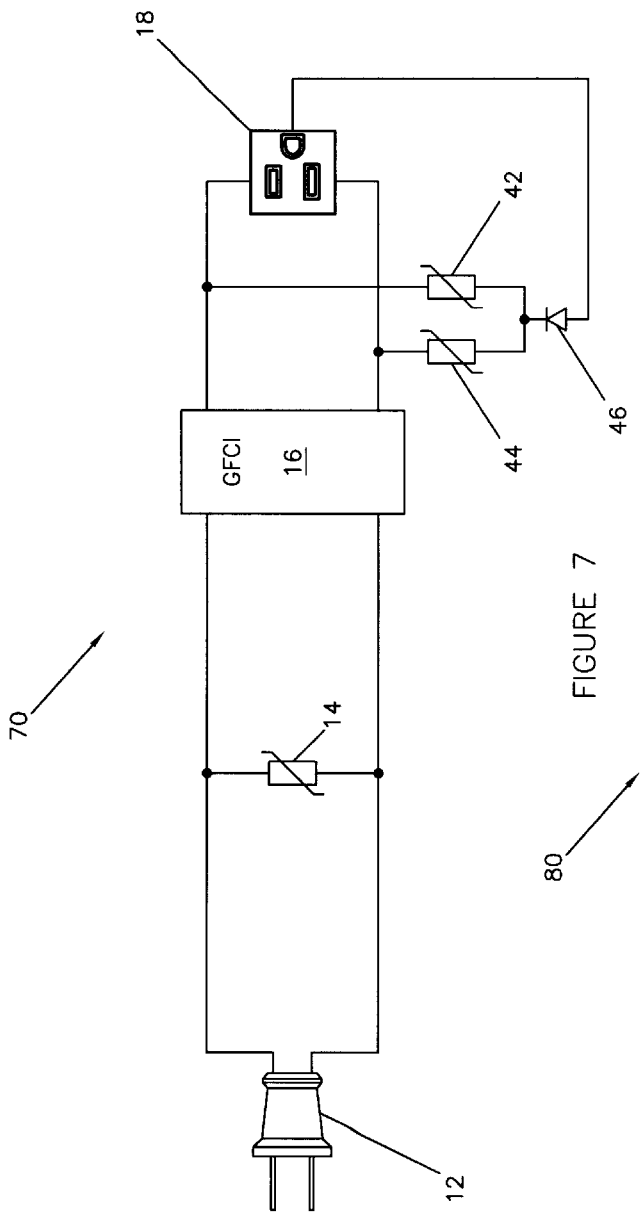
FIG. 7 is a schematic diagram of a seventh embodiment of the present invention.

FIG. 1 is a schematic diagram of a first embodiment of the present invention. In FIG. 1 AC power plug 12 has at least two prongs and is adapted to be connected to AC power lines. Connected between the AC power lines is an overvoltage protection circuit comprising MOV 14, which may be a V150LA20B made by Harris Semiconductor Corp., P. O. Box 883, Melbourne, Fla. 32902. GFCI 16 may be a GFI15B-K made by Eagle Electric Mfg. Co., Inc., Long Island City, N.Y. 11101. The GFCI is connected in series with the AC power lines and to the AC overvoltage protection circuit. AC power receptacle 18 accepts a three-prong AC power plug. The two terminals of receptacle 18 which carry the AC power are connected to GFCI 16 and MOV 14. Electrical equipment plugged into receptacle 18 will be protected from overvoltage conditions appearing on the AC power line.

FIG. 2 is a schematic diagram of a second embodiment of the invention. FIG. 2 differs from FIG. 1 in that in FIG. 1 the GFCI was located between receptacle 18 and MOV 14 whereas in FIG. 2 MOV 14 is located between receptacle 18 and GFCI 16. It is preferred to have the overvoltage protection circuit before, rather than after, the GFCI. The preferred arrangement is shown in FIG. 1.

FIG. 3 is a schematic diagram of a third embodiment of the present invention. FIG. 3 differs from FIG. 1 in that the overvoltage protection circuit comprises thermal sensing fuse 22 in addition to MOV 14. A suitable thermal fuse is available from Microtemp Corp. under part number 4178A1. FIG. 4 is a schematic diagram of a fourth embodiment of the present invention. In FIG. 4 the overvoltage protection circuit is located between receptacle 18 and GFCI 16 whereas in FIG. 3 (the preferred arrangement) GFCI 16 is located between receptacle 18 and the overvoltage protection circuit.

FIG. 5 is a schematic diagram of a fifth embodiment of the present invention. FIG. 5 includes a circuit breaker 24, an ON/OFF switch 26 and an indicator circuit comprising resistor 28 and LED 32. LED 32 may be any suitable LED, while resistor 28 may be 10K ohms, ½ watt. FIG. 5 also includes a filter circuit comprising inductors 34, 36 and capacitor 38. Inductors 34, 36 may be 10 to 15 microhenries, while capacitor 38 may be 0.47 microfarads, 250 volts. FIG. 6 is similar to FIG. 5 except that in FIG. 6 (the preferred arrangement) the AC overvoltage protection circuit and the filter circuit are located before GFCI 16.

Figure 8:
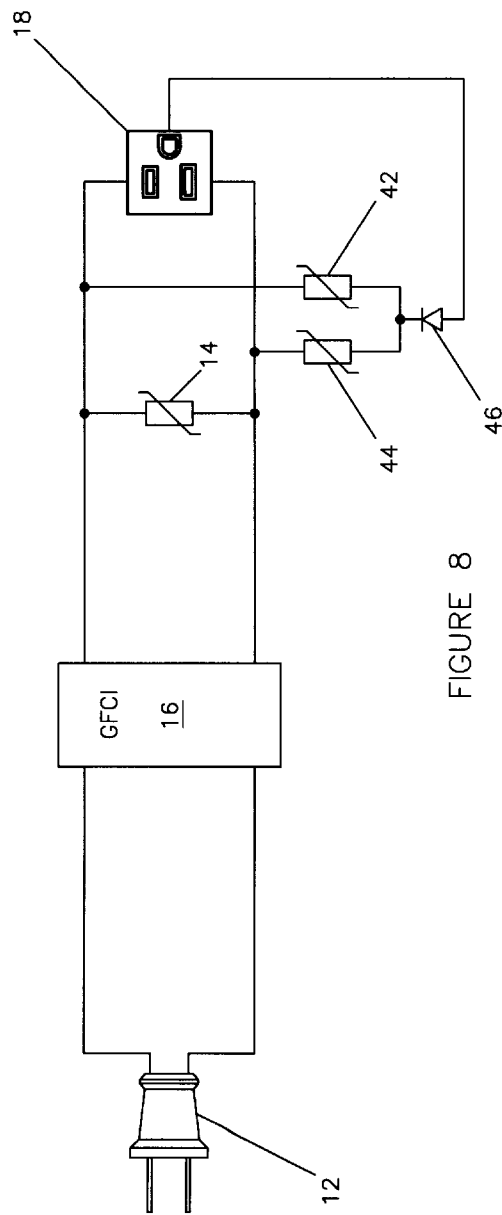
FIG. 8 is a schematic diagram of an eighth embodiment of the present invention.

FIG. 7 is a schematic diagram of a seventh embodiment of the present invention. FIG. 7 discloses a "virtual ground" circuit comprising diode 46 and MOVs 42, 44 connected between the ground conductor of AC receptacle 18 and the AC power lines. The virtual ground circuit provides a return path for voltage surges appearing at receptacle 18. The embodiment of the invention shown in FIG. 7 protects electrical equipment having a three prong AC power plug when the equipment is plugged into receptacle 18. FIG. 8 is similar to FIG. 7 except that in FIG. 7 the AC overvoltage protection circuit precedes GFCI 16 (the preferred arrangement) whereas in FIG. 8 the AC overvoltage protection circuit follows GFCI 16. MOVs 42, 44 may be the same as MOV 14, while diode 46 may be a 3 AMP, 1000 PIV diode.

FIG. 9 is a schematic diagram of a ninth embodiment of the present invention. FIG. 9 discloses thermal sensing fuses 52, 54 as part of the virtual ground circuit. Fuses 52, 54 may be the same as fuse 22. FIG. 10 is similar to FIG. 9 except that in FIG. 9 the AC overvoltage protection circuit precedes GFCI 16 (the preferred arrangement) whereas in FIG. 10 it follows GFCI 16.

FIG. 11 is a schematic diagram of an eleventh embodiment of the present invention. FIG. 11 includes circuit breaker 24, ON/OFF switch 26, an indicator circuit comprising resistor 28 and LED 32, an overvoltage protection circuit comprising thermal sensing fuse 22 and MOV 14, a filter circuit comprising inductors 34, 36 and capacitor 38, GFCI 16, receptacle 18 and a virtual ground circuit comprising diode 46, MOVs 42, 44 and thermal fuses 52, 54. FIG. 12 is similar to FIG. 11 except that in FIG. 11 the overvoltage protection and filter circuits precede the GFCI (the preferred arrangement) whereas in FIG. 12 they follow the GFCI.

FIG. 13 is a schematic diagram of a thirteenth embodiment of the present invention. In FIG. 13 the overvoltage protection circuit comprises an MOV in series with a two electrode gas discharge tube and the virtual ground circuit comprises two MOVs, each MOV in series with a two electrode gas discharge tube. A suitable gas discharge tube is a TII 44 tube available from TII Industries, Inc., Copiague, N.Y., which has a breakdown voltage between 300 and 500 VDC. Placing a gas discharge tube in series with the MOVs essentially eliminates leakage current through the MOVs, one of the major problems with MOVs.

FIG. 14 is a schematic diagram of a fourteenth embodiment of the invention. FIG. 14 is similar to FIG. 7 except that in FIG. 7 the virtual ground circuit is connected to the AC power lines after the GFCI, whereas in FIG. 14 it is connected to the AC power lines before the GFCI.

Figure 15:
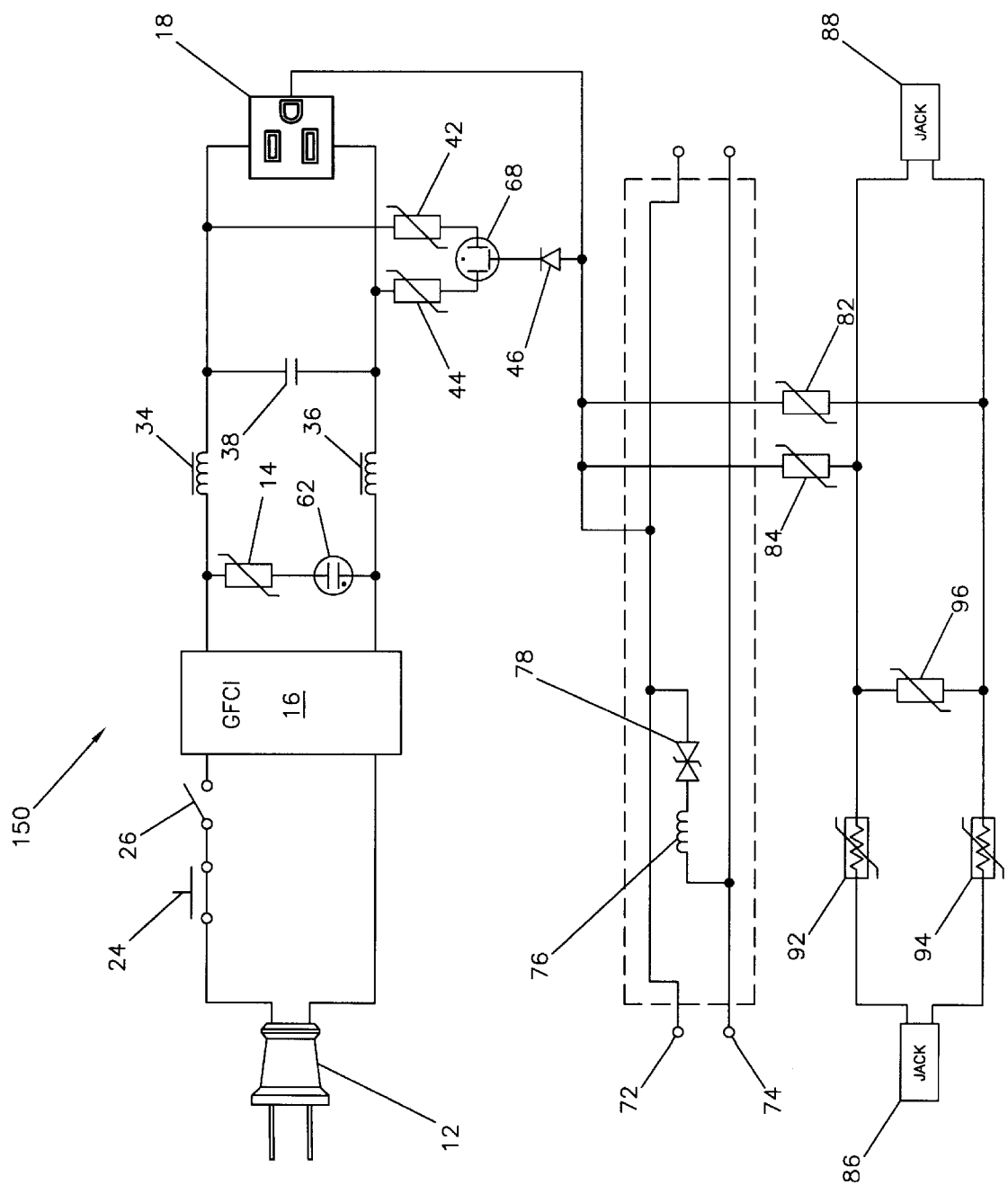
FIG. 15 is a schematic diagram of a fifteenth embodiment of the present invention.

FIG. 15 is a schematic diagram of a fifteenth embodiment of the present invention. FIG. 15 discloses a combination GFCI/AC overvoltage protection circuit, a coaxial transmission line overvoltage protection circuit and a communication line overvoltage protection circuit. The combination GFCI/AC overvoltage protection circuit comprises circuit breaker 24, ON/OFF switch 26, GFCI 16, an AC overvoltage protection circuit comprising MOV 14 and two electrode gas discharge tube 62, a filter circuit comprising inductors 34, 36 and capacitor 38, AC power receptacle 18 and a virtual ground circuit comprising diode 46, three electrode gas discharge tube 68 and MOVs 42, 44. A suitable three electrode gas discharge tube is a TII 11 tube available from TII Industries, Inc. and has a breakdown voltage between 300 and 500 VDC. In this application a three electrode gas discharge tube is equivalent to two two electrode gas discharge tubes.

The coaxial transmission line overvoltage protection circuit comprises inductor 76 connected in series with avalanche diode 78 and between the center conductor 74 and shield 72 of the coaxial transmission line. The shield is also connected to the virtual ground circuit and the ground electrode of receptacle 18. Inductor 76 may be 6.8 microhenries, while diode 78 may be a 1.5 KE12V avalanche diode available from General Instrument Corp.

The communication line overvoltage protection circuit comprises jacks 86, 88 (which may be RJ11 or RJ45 jacks) which are adapted to be connected to a communication line such as a telephone line or a high speed data line. The communication line overvoltage protection circuit includes positive temperature coefficient resistors (PTCRs) 92, 94 connected in series with the communication lines, MOV 96 connected across the communication lines and MOVs 82, 84 connected between the communication lines and the virtual ground. Suitable MOVs 82, 84 and 96 are available from Harris Semiconductor Corp. under part number V120ZA6. Suitable PTCRs are available from Raychem Corp., 300 Constitution Drive, Menlo Park, Calif. under part number TR600-15.

Figure 16:
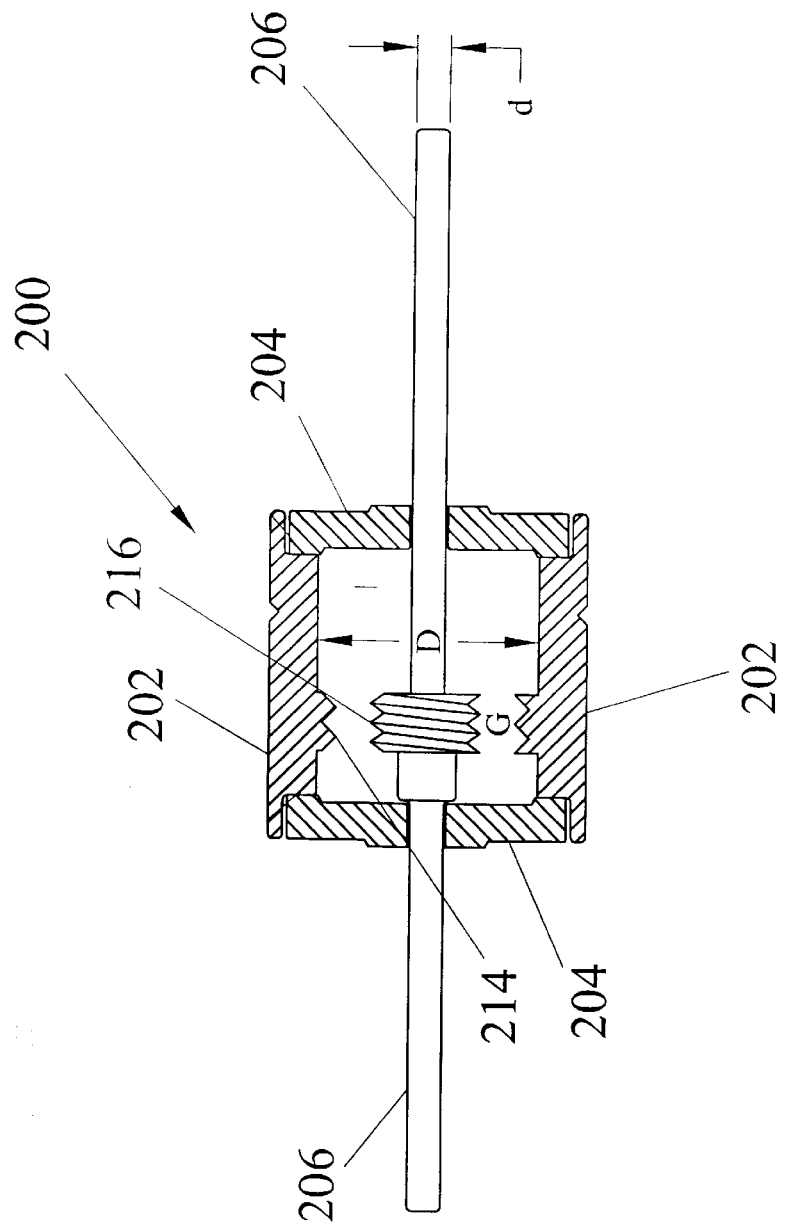
FIG. 16 is a cross sectional view of a prior art coaxial surge arrestor suitable for use with the embodiments shown in FIG. 15.

FIG. 16 is a reproduction of FIG. 14 from U.S. Pat. No. 5,566,056 issued to Nisar Chaudhry on Oct. 15, 1996. FIG. 16 illustrates a coaxial surge arrestor which may be used in the coaxial transmission line overvoltage protection circuit in FIG. 15. As explained at column 6, line 54 through column 7, line 51 of U.S. Pat. No. 5,566,056, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, the surfaces 214 and 216 are preferably coated with a low work function material to reduce the breakdown voltage and enhance the firing characteristics of the gas discharge tube. The gas discharge occurs in the region "G" between surfaces 214 and 216. Region "G" is the active discharge region.

As also shown in FIG. 16, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 16, the medium is an inert gas which has a dielectric constant of approximately one. Therefore, the impedance of the gas discharge tube varies between the insulating ends as the logarithm of the ratio D/d. The insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G". See FIG. 14 of U.S. Pat. No. 5,566,056.

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ratio of the region "G" to the region "I" may be on the order of one to two. A suitable coaxial gas discharge tube is available from TII Industries under part number 00173004, which has a breakdown voltage between 150 and 300 VDC.

While the present invention has been described by reference to various preferred embodiments, it will be understood by persons skilled in the art that many modifications and variations may be made in those preferred embodiments without departing from the spirit and scope of the present invention.

What is claimed is:

1. Combination ground fault circuit interrupter/surge suppressor apparatus adapted to be connected to first and second AC power lines and which provides overvoltage protection for the AC power lines without using a separate ground conductor, the apparatus comprising:

(a) an AC overvoltage protection circuit connected between the AC power lines for protecting against voltage surges on the AC power lines;

(b) a ground fault circuit interrupter connected to the AC overvoltage protection circuit and connected in series with the AC power lines;

(c) at least one AC power receptacle having two AC power terminals and one ground terminal, the receptacle being electrically connected to the AC overvoltage protection circuit, the ground fault circuit interrupter and the AC power lines; and (d) a virtual ground circuit connected between the ground terminal of the AC power receptacle and the AC power lines for providing a return path to the AC power lines for voltage surges appearing at the AC power receptacle.

2. Integral combination ground fault circuit interrupter/surge suppressor apparatus adapted to be connected to first and second AC power lines and which provides overvoltage protection for the AC power lines without using a separate ground conductor, the apparatus comprising:

(a) an AC power plug having at least two prongs for connection to the AC power lines;

(b) an AC overvoltage protection circuit connected between the AC power lines for protecting against voltage surges on the AC power lines;

(c) a ground fault circuit interrupter connected to the AC overvoltage protection circuit and connected in series with the AC power lines;

(d) at least one AC power receptacle having two AC power terminals and one ground terminal, the receptacle being electrically connected to the AC overvoltage protection circuit, the ground fault circuit interrupter and the AC power lines; and (e) a virtual ground circuit connected between the ground terminal of the AC power receptacle and the AC power lines for providing a return path to the AC power lines for voltage surges appearing at the AC power receptacle.

3. The apparatus of claim 2 wherein the AC power plug has only two prongs.

4. The apparatus of any of claims 1 or 2 wherein the ground fault circuit interrupter is located between the AC power receptacle and the AC overvoltage protection circuit.

5. The apparatus of any of claims 1 or 2 wherein the AC overvoltage protection circuit is located between the AC power receptacle and the ground fault circuit interrupter.

6. The apparatus of any of claims 1 or 2 wherein the AC overvoltage protection circuit comprises at least one MOV connected between the AC power lines.

7. The apparatus of any of claims 1 or 2 wherein the AC overvoltage protection circuit comprises at least one MOV and at least one gas discharge tube connected in series, the MOV and gas discharge tube being connected between the AC power lines.

8. The apparatus of any of claims 1 or 2 wherein the AC overvoltage protection circuit comprises at least one thermal sensing fuse and at least one MOV connected in series, the MOV and thermal sensing fuse being connected between the AC power lines.

9. The apparatus of claim 1 or claim 2 wherein the virtual ground circuit comprises two MOVs connected between the ground terminal of the AC power receptacle and the AC power lines, one MOV being connected to each AC power line.

10. The apparatus of claim 9 wherein the virtual ground circuit further comprises at least one diode connected in series with the two MOVs.

11. The apparatus of claim 9 wherein the virtual ground circuit further comprises a three electrode gas discharge tube connected in series with the two MOVs.

12. The apparatus of claim 11 wherein the virtual ground circuit further comprises at least one diode connected in series with the gas discharge tube.

13. The apparatus of claim 9 wherein the virtual ground circuit further comprises two two electrode gas discharge tubes, one gas discharge tube being connected in series with each MOV.

14. The apparatus of claim 13 wherein the virtual ground circuit further comprises at least one diode connected in series with the gas discharge tubes.

15. The apparatus of claim 9 wherein the virtual ground circuit further comprises at least one thermal sensing fuse connected in series with each MOV.

16. The apparatus of claim 1 or claim 2 further comprising a coaxial transmission line overvoltage protection circuit adapted to be connected to a coaxial transmission line for protecting against voltage surges on the coaxial transmission line, the coaxial transmission line overvoltage protection circuit being electrically connected to the ground terminal of the AC power receptacle and the virtual ground circuit.

17. The apparatus of claim 16 wherein the coaxial transmission line overvoltage protection circuit comprises an avalanche diode and an inductor connected in series.

18. The apparatus of claim 16 wherein the coaxial transmission line overvoltage protection circuit comprises a coaxial gas discharge tube comprising a hollow conductive housing, insulating ends adapted to seal the housing, an inert gas sealed in the housing, a center conductor extending through the housing, the center conductor having a longitudinal axis oriented in a direction parallel to the direction of signal transmission, the diameter of the center conductor being varied along at least a portion of the length of the conductor within the housing for matching the impedance of the coaxial gas discharge tube to that of the coaxial transmission line.

19. The apparatus of claim 1 or claim 2 further comprising a communication line overvoltage protection circuit adapted to be connected to communication lines for protecting against voltage surges on the communication line, the communication line overvoltage protection circuit being electrically connected to the ground terminal of the AC power receptacle and the virtual ground circuit.

20. The apparatus of claim 19 wherein the communication line overvoltage protection circuit comprises at least one MOV connected between the communication lines and at least one MOV connected between each communication line and the ground conductor of the AC power receptacle.

21. The apparatus of claim 1 or claim 2 further comprising:

(a) a coaxial transmission line overvoltage protection circuit adapted to be connected to a coaxial transmission line for protecting against voltage surges appearing on the coaxial transmission line;

(b) a communication line overvoltage protection circuit adapted to be connected to communication lines for protecting against voltage surges on the communication line; and (c) both the coaxial transmission line overvoltage protection circuit and the communication line overvoltage protection circuit being electrically connected to the ground terminal of the AC power receptacle and the virtual ground circuit.

* * * * *